United States Patent
Yamashita et al.

(10) Patent No.: US 6,648,564 B2
(45) Date of Patent: Nov. 18, 2003

(54) BURR REMOVING METHOD AND APPARATUS

(75) Inventors: Koji Yamashita, Yokohama (JP); Hiromasa Hayashi, Kamakura (JP); Susumu Okawa, Yokohama (JP); Koji Okushima, Pittsburgh, PA (US)

(73) Assignees: NKK Corporation, Tokyo (JP); JP Steel Plantech Co., Yokohama (JP)

( * ) Notice: Subject to any disclaimer, the term of this patent is extended or adjusted under 35 U.S.C. 154(b) by 0 days.

(21) Appl. No.: 10/371,433

(22) Filed: Feb. 21, 2003

(65) Prior Publication Data

US 2003/0129034 A1 Jul. 10, 2003

Related U.S. Application Data

(62) Division of application No. 10/006,947, filed on Dec. 3, 2001, now abandoned, which is a division of application No. 09/864,448, filed on May 24, 2001, now Pat. No. 6,402,441, which is a division of application No. 09/595,226, filed on Jun. 16, 2000, now Pat. No. 6,296,428, which is a continuation of application No. PCT/JP99/05971, filed on Oct. 28, 1999.

(30) Foreign Application Priority Data

Nov. 24, 1998 (JP) ............................................ 10-332338
Dec. 22, 1998 (JP) ............................................ 10-363843

(51) Int. Cl.[7] ................................................ B23C 3/00
(52) U.S. Cl. ........................ 409/132; 409/140; 83/869
(58) Field of Search ................. 83/869, 861; 409/131, 409/132, 140, 228, 149, 188, 195, 138, 139, 157, 203

(56) References Cited

U.S. PATENT DOCUMENTS

| | | |
|---|---|---|
| 1,995,104 A | 3/1935 | Morton |
| 2,202,910 A | 6/1940 | Iversen |
| 2,273,624 A | 2/1942 | Campbell et al. |
| 2,592,640 A * | 4/1952 | Bailis .......................... 409/140 |
| 2,936,679 A | 5/1960 | Thuerwachter |
| 2,959,842 A | 11/1960 | Meyers |
| 3,040,632 A | 6/1962 | Walter et al. |
| 3,398,613 A | 8/1968 | Gallotti |

(List continued on next page.)

FOREIGN PATENT DOCUMENTS

| | | | |
|---|---|---|---|
| DE | 3515111 | * 11/1986 | .................. 409/140 |
| EP | 247387 | * 12/1987 | .................. 409/140 |
| JP | 51-42040 | 4/1976 | |
| JP | 52-43754 | 4/1977 | |
| JP | 53-147649 A | 12/1978 | |
| JP | 58-151971 A | 9/1983 | |
| JP | 59-176711 | 11/1984 | |
| JP | 61-30287 A | 2/1986 | |
| JP | 214908 | * 9/1986 | .................. 409/140 |
| JP | 61-199312 | 12/1986 | |
| JP | 2-107416 A | 8/1990 | |
| JP | 4-178273 | 6/1992 | |
| JP | 4-133512 A | 12/1992 | |
| JP | 6-3523 A | 1/1994 | |

Primary Examiner—Daniel W. Howell
(74) Attorney, Agent, or Firm—Frishauf, Holtz, Goodman & Chick, P.C.

(57) ABSTRACT

A burr located at an edge of a steel piece is cut by disposing a cutter such that the flank of the cutter is substantially in parallel with the surface of the steel piece and the angle between the cutting edge of the cutter and the edge of the steel piece which the burr intersects is at least 45°. The cutter is relatively moved toward the outside of the steel piece along the lengthwise direction of the burr, or the cutter is disposed with the flank of the cutter substantially in parallel with the surface of the steel piece and the angle between the cutting edge of the cutter and the edge of the steel piece is at least 90°. The burr located at the edge of the steel piece is cut by relatively moving the cutter perpendicularly to the lengthwise direction of the burr.

3 Claims, 13 Drawing Sheets

U.S. PATENT DOCUMENTS

| | | |
|---|---|---|
| 3,952,630 A | 4/1976 | Fencl et al. |
| 4,610,586 A | 9/1986 | Langeder |
| 4,859,126 A | 8/1989 | Mancuso |
| 5,192,175 A | 3/1993 | Oosawa et al. |
| 5,259,440 A | 11/1993 | Lotz et al. |
| 6,067,880 A | 5/2000 | Arrigoni |
| 6,070,311 A | 6/2000 | Lotz |

* cited by examiner

BURR REMOVING METHOD AND APPARATUS

This is a Division of application Ser. No. 10/006,947 filed Dec. 3, 2001, abandoned, which is a Division of application Ser. No. 09/864,448 filed May 24, 2001, now U.S. Pat. No. 6,402,441 issued Jun. 11, 2002, which is a Division of application Ser. No. 09/595,226 filed Jun. 16, 2000, now U.S. Pat. No. 6,296,428 issued Oct. 2, 2001, which in turn is a Continuation of International Application No. PCT/JP99/05971 filed Oct. 28, 1999.

TECHNICAL FIELD

The present invention relates to a burr removing method and apparatus for removing burrs such as welding burrs and the like which are formed when, for example, billets and the like are subjected to butt welding in the continuous rolling of steel bars and the like.

BACKGROUND ART

In conventional steel rolling lines, steel pieces such as billets, blooms and the like are rolled one by one and made to products. Recently, however, Japanese Unexamined Patent Publication Nos. 52-43754, 58-151971, 61-30287 and the like propose a method of subjecting a plurality of steel pieces such as billets and the like, which were extracted from a heating furnace, to flash butt welding and continuously rolling them to prevent the drop of a yield caused by the removal of the crop portions at the leading and trailing ends of the steel pieces and to increase productivity.

When steel pieces are welded to each other by flash butt welding, welding burrs are formed to them at the welded sections thereof by the flash and pressure applied thereto. Since the welding burrs are relatively large, they act as flaws in the rolling operation carried out thereafter. Thus, there is a possibility that a yield is lowered by the flaws, and when the steel pieces are wires and like, there is a possibility that they are broken at the portions of the flaws while they are rolled. Accordingly, the welding burrs must be perfectly removed before the steel pieces are rolled.

Japanese Unexamined Patent Publication Nos. 51-42040, 53-147649, 4-178273 and the like disclose burr removing apparatuses for a flash butt welder. However, any of the burr removing apparatuses proposed by them has a fixed-blade-type burr removing unit assembled therein for cutting welding burrs with a cutter fixed between a welder main body and a steel piece moving car so that the welding burrs can be cut just after a welding operation is finished because the cutting resistance of them is low at the time.

Further, Japanese Unexamined Utility Model Publication Nos. 59-176711, 61-199312 and the like disclose a rotary-blade-type burr removing apparatuses for removing a burr formed at an edge of a steel piece by pressing a rotatable circular cutting edge against the burr.

However, in any of the fixed-type-blade and rotary-blade-type burr removing methods, when a stripe-shaped burr 3 formed across the surface of a steel piece 1 is cut along the burr using a cutter 5 as shown in FIG. 1, a protruding burr 4 is formed at an edge of the steel piece 1 although the cut burr 3 is removed to the outside of the steel piece 1 as a cut chip. Accordingly, a problem of the drop of a yield and the like described above is caused by the protruding burr 4 in the rolling operation carried out thereafter.

DISCLOSURE OF THE INVENTION

An object of the present invention is to provide a burr removing method and apparatus by which no protruding burr is formed at the edge of a steel piece from which a burr is removed.

The above object can be achieved by a burr removing method which comprises the steps of disposing a cutter such that the flank of the cutter is substantially in parallel with the surface of a steel piece on which a burr exists and the angle between the cutting edge of the cutter and the edge of the steel piece which the burr intersects is at least 45°; and cutting the burr located at the edge of the steel piece by relatively moving the cutter toward the outside of the steel piece along the lengthwise direction of the burr.

When a cutter having a polygonal cutting edge is used as the cutter, the burr can be cut with a plurality of cutting edges, whereby the life of the cutter can be increased.

When a cutter having a circular cutting edge which corresponds to a case in which the number of sides of the polygonal cutting edge is increased infinitely, the burr located at an edge of a steel piece may be cut by disposing the cutter having the circular cutting edge such that the flank of the cutter is substantially in parallel with the surface of the steel piece on which the burr exists and the following formula is satisfied with respect to the burr; and cutting the burr located at the edge of the steel piece by the cutter by relatively moving the cutter toward the outside of the steel piece along the lengthwise direction of the burr;

$$R/2 + W/2 < \Delta < R - W/2 \tag{1}$$

where, W shows the width of the burr, R shows the radius of the cutter, $\Delta$ shows the shortest distance from the center of the cutter to the center line of the width of the burr.

When a rotatable cutter having a circular cutting edge is used, a burr can be naturally cut with a different portion of the circular cutting edge without the need of a drive force, whereby the life of the cutter can be increased.

The cutter is moved relatively to a burr along the lengthwise direction of the burr in the methods described above. However, the object of the present invention can be also achieved even if the cutter is moved relatively to the burr perpendicularly to the lengthwise direction of a burr as shown in the following methods.

That is, a burr can be removed without the occurrence of a protruding burr by a burr cutting method which comprises the steps of disposing a cutter such that the flank of the cutter is substantially in parallel with the surface of a steel piece on which the burr exists and the angle between the cutting edge of the cutter and the edge of the steel piece which the burr intersects is at least 90°; and cutting the burr located at the edge of the steel piece by relatively moving the cutter perpendicularly to the lengthwise direction of the burr.

When a cutter having a polygonal cutting edge is used as the cutter as described above, the life of the cutter can be increased.

Further, when a cutter having a circular cutting edge is used, a burr located at an edge of a steel piece may be cut by disposing the cutter having the circular cutting edge such that the flank of the cutter is substantially in parallel with the surface of the steel piece on which the burr exists and the center of the cutter is located outwardly of the edge of the steel piece which the burr intersects; and cutting the burr located at the edge of the steel piece by relatively moving the cutter perpendicularly to the lengthwise direction of the burr.

When a rotatable cutter having a circular cutting edge is used as the cutter as described above, the life of the cutter can be increased.

The burr removing method of moving a cutter in the lengthwise direction of a burr as the present invention can be realized by a burr removing apparatus which comprises a burr detector; two cutters each having a circular cutting edge; and a drive control mechanism for causing the cutters to approach to a burr in response to a burr detecting signal issued by the burr detector, disposing the cutters so that the following formula (1) are satisfied with respect to the burr and then moving the cutters along the lengthwise direction of the burr, wherein the two cutters are disposed across a steel piece;

$$R/2+W/2<\Delta<R-W/2 \tag{1}$$

where, W shows the width of the burr, R shows the radius of the cutter, $\Delta$ shows the minimum distance from the center of the cutter to the center line of the width of the burr.

Further, the burr removing method of moving a cutter such that it is perpendicular to the lengthwise direction of a burr can be realized by a burr removing apparatus which comprises a burr detector; a plurality of at least two cutters; and a drive control mechanism for causing the cutters to approach to a burr in response to a burr detecting signal issued by the burr detector, wherein two cutters of the plurality of cutters have a circular cutting edge and the two cutters having the circular cutting edge are disposed such that the centers thereof are separately located outwardly of both the edges of a steel piece which the burr intersects.

BEST MODE FOR CARRYING OUT THE INVENTION

As described above, a protruding burr is formed when a burr located at an edge of a steel pipe is cut by the cutting edge of a cutter through the force applied thereto by the cutter to cause the burr to be pushed out to the outside of the steel piece. Therefore, the occurrence of the protruding burr can be prevented when the burr is cut by the force applied thereto in such a manner that the force is directed inward of the steel piece in place of force for pushing out the burr outward from the edge of the steel piece.

Burr removing methods of the present invention are based on this fundamental principle. Therefore, the present invention relates to methods of removing a burr located at an edge of a steel piece. While the methods of the present invention are applicable to a burr located in the interior of a steel piece, even if the burr is cut by another method, the effect of the present invention is not spoiled.

Embodiment 1

Figure 1:
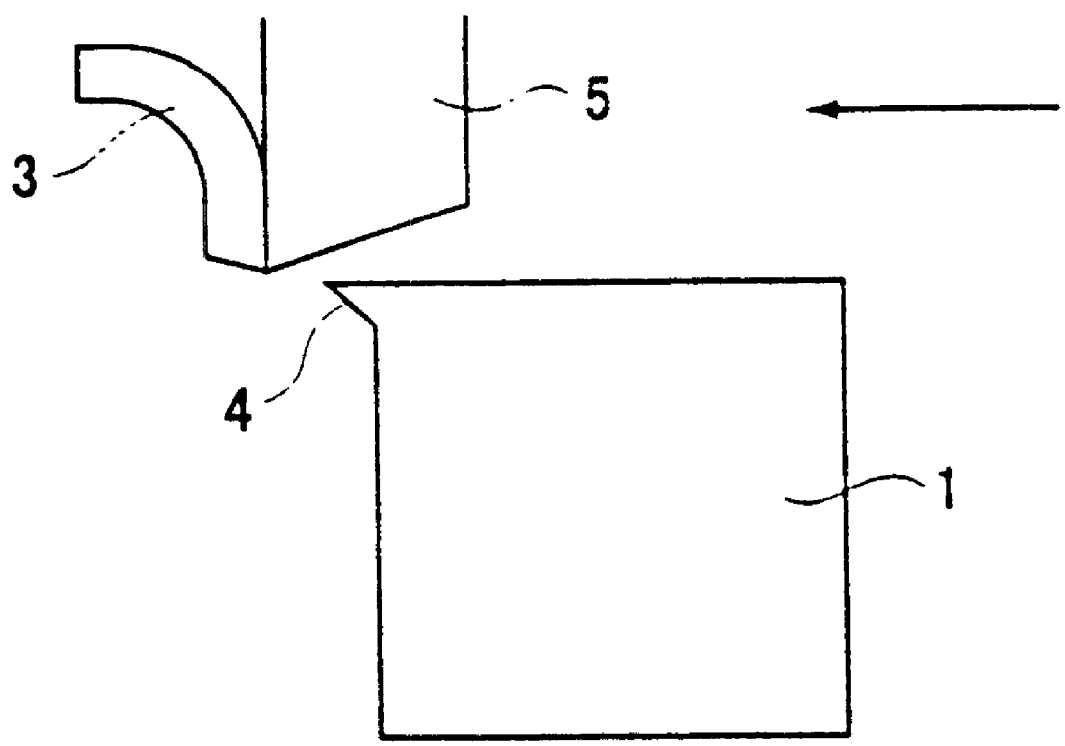
FIG. 1 is a schematic view of a conventional burr removing method.
Figure 2:
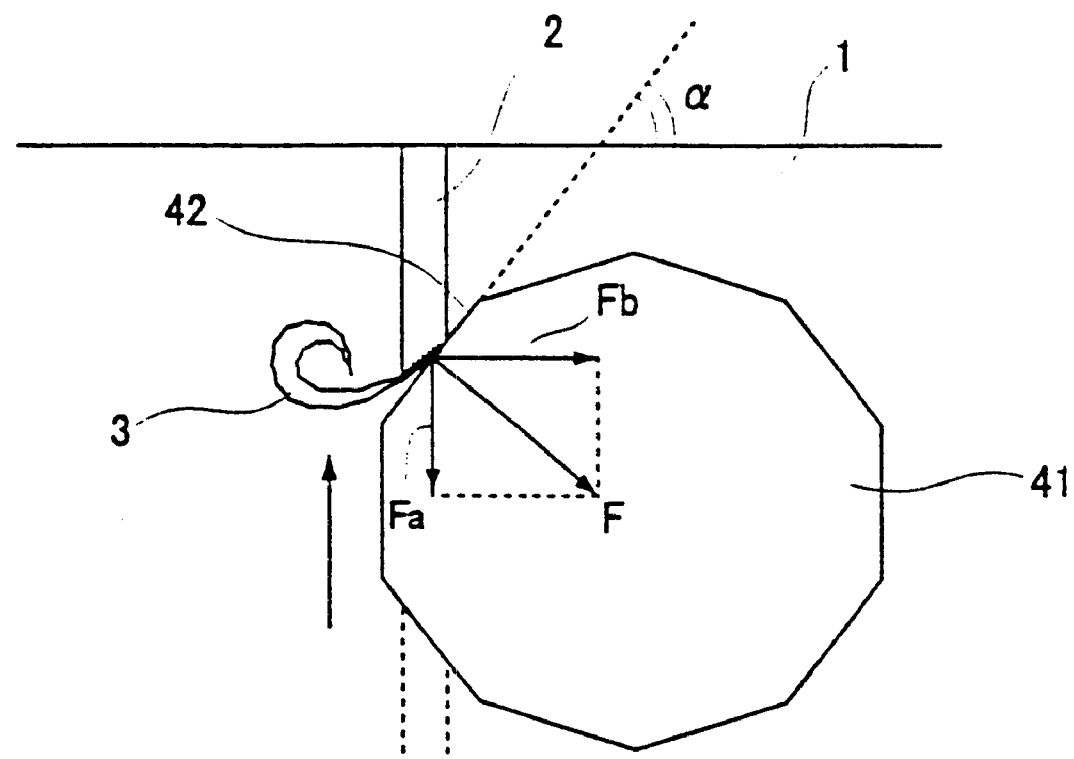
FIG. 2 is a schematic view of a burr removing method using a cutter having a polygonal cutting edge as an example of the present invention.

FIG. 2 schematically shows a burr removing method using a cutter having a polygonal cutting edge as an example of the present invention.

In the method, a cutter 41 having a polygonal cutting edge 42 is disposed such that the flank of the cutter 41 (lower surface of the cutter in the figure) is substantially in parallel with the surface of a steel piece 1 on which a burr 2 exists and the angle a between the polygonal cutting edge 42, which cuts the burr 2, and the edge of the steel piece 1 which intersects the burr 2 is at least 45°. Then, the burr 2 at the edge of the steel piece 1 is cut by moving the cutter 41 toward the outside of the steel piece 1 along the lengthwise direction of the burr 2.

Since the burr 2 is cut with the angle a between the polygonal cutting edge 42, which cuts the burr 2, and the edge of the steel piece 1, which the burr 2 intersects, set to at least 45°, a press load Fa, which is a component force of a cutting reaction force imposed on the polygonal cutting edge 42 and directed toward the outside of the edge of the steel piece 1, can be made smaller than a vertical reaction force Fb whose direction is in parallel with the edge of the steel piece 1. Accordingly, a cut burr 3 is pushed inward of the steel piece 1 in place of outward thereof, and thus no protruding burr is formed.

Figure 3:
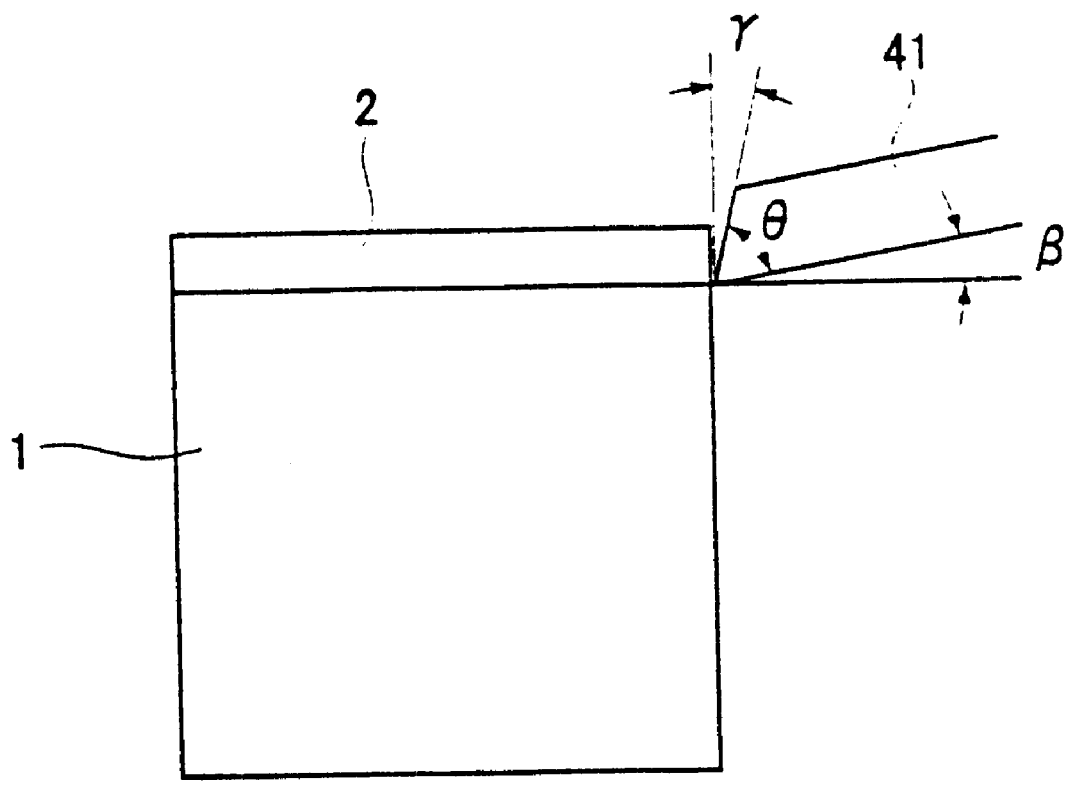
FIG. 3 is a view showing the positional relationship between a cutter and a surface of a steel piece.
Figure 4A:
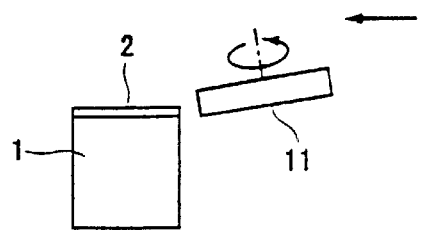
FIGS. 4A, 4B, 4C, 4D and 4E are schematic views (side elevational views) of a burr removing method using a cutter having a circular cutting edge as an example of the present invention.
Figure 4B:
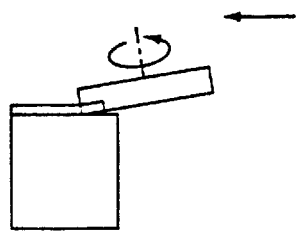
Figure 4C:
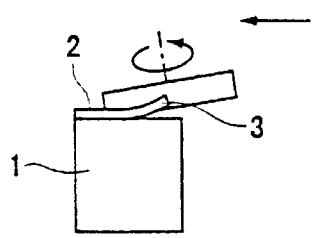
Figure 4D:
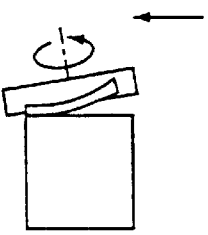
Figure 4E:
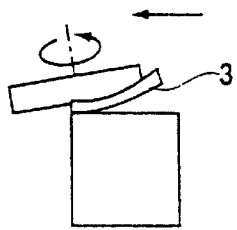
Figure 5A:
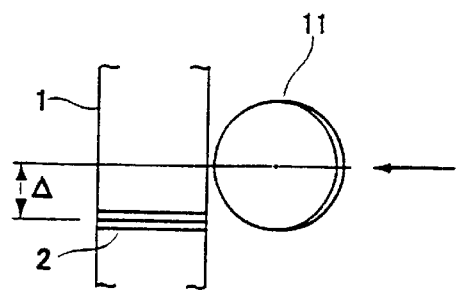
FIGS. 5A, 5B, 5C, 5D and 5E are plan views of FIGS. 4A, 4B, 4C, 4D and 4E, respectively.
Figure 5B:
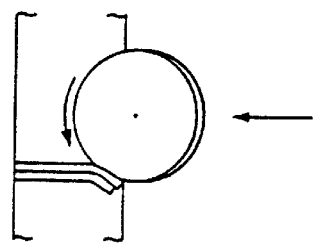
Figure 5C:
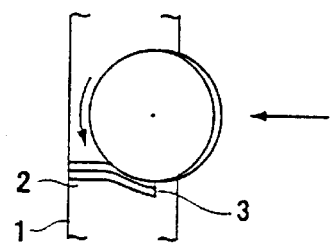
Figure 5D:
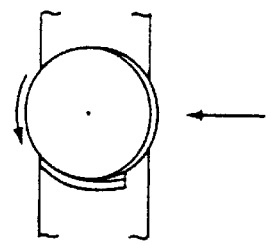
Figure 5E:
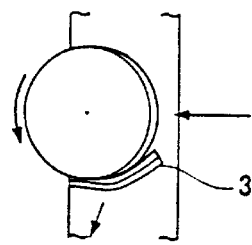

Note that when the flank of the cutter 41 is set substantially in parallel with the surface of the steel piece 1 on which the burr 2 exists, it is sufficient to set the angle $\beta$ (hereafter, referred to as flank angle) between the flank of the cutter 41 and the surface of the steel piece 1 to 1–5° as shown in FIG. 3. Further, the angle $\gamma$ (hereinafter referred to as rake angle) between the cutting surface of the cutter 41 and a perpendicular line vertical to the surface of the steel piece 1, is suitably selected in consideration of a cutting resistance and the life of the cutter depending upon an included angle $\theta$.

Further, the shape of the polygonal cutting edge 42 need not be perfectly polygonal, and the effect of the present invention can be obtained even if the angles of it are rounded or the cutting edge is made somewhat to an arc-shape. In an arc-shaped cutting edge, it is sufficient to set the angle between the tangential line of a circle and the edge of the steel piece which a burr intersects to at least 45°.

Embodiment 2

FIG. 4A–FIG. 4E and FIG. 5A–FIG. 5E schematically show a burr removing method using a cutter having a circular cutting edge as an example of the present invention.

This is a cutting method of cutting a burr 2 at an edge of a steel piece by moving the cutter 11 having the circular cutting edge in such a manner that the cutter 11 is moved toward the outside of the steel piece 1 along the lengthwise direction of the burr 2 while maintaining the flank of the cutter 11 substantially in parallel with the surface of the steel piece 1 on which the burr 2 exists.

Figure 6A:
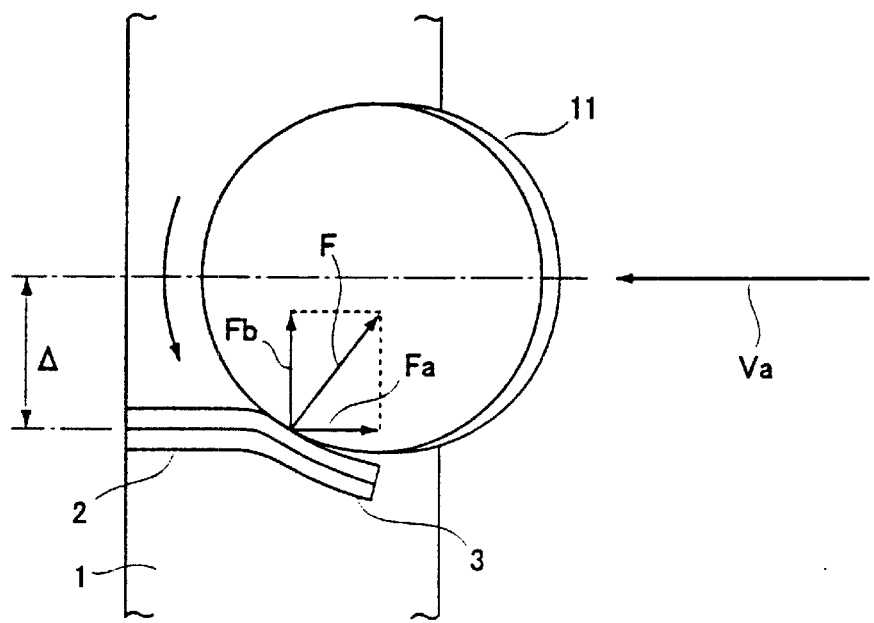
FIG. 6A and FIG. 6B are views explaining FIG. 4C and FIG. 4E in detail, respectively.

At the time, when the following formula (1) is satisfied, the press load Fa directed toward the outside of the edge of the steel piece 1 can be made smaller than the vertical reaction force Fb whose direction is in parallel with the edge of the steel piece 1 because the burr 2 is cut with the circular cutting edge which is located at a position spaced apart from the line, which passes through the center of the cutter 11 and is in parallel with the burr 2, by at least R/2 as shown in FIG. 6A.

$$R/2+W/2<A<R-W/2 \tag{1}$$

Figure 6B:
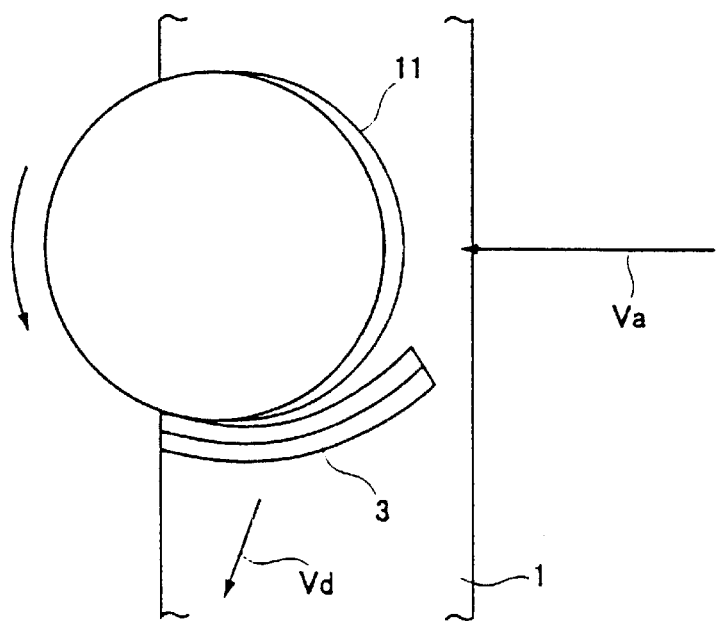

Therefore, as shown in FIG. 6B, when the burr 2 is pushed and cut with the travelling speed Va of the cutter 11, no protruding burr is formed because a cut burr 3 is pushed out toward the direction Vb on the surface of the steel piece 1 in place of being pushed out into a free space.

Figure 7A:
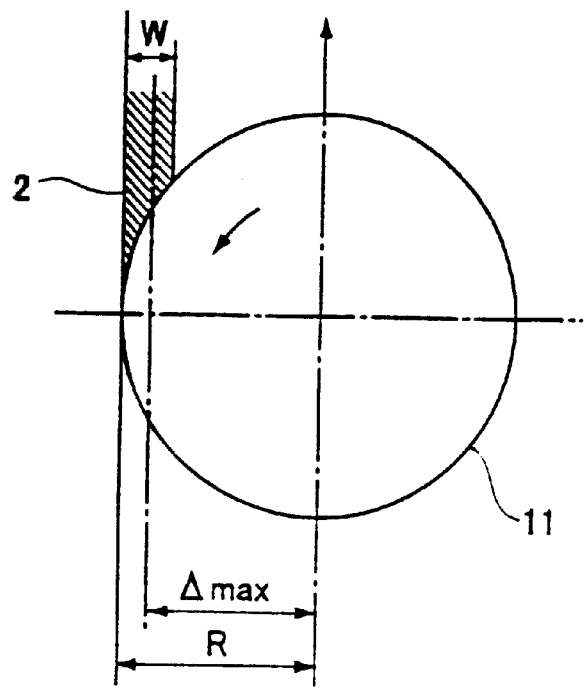
FIG. 7A and FIG. 7B are views explaining the positional relationship between the cutter having the circular cutting edge and a burr.
Figure 7B:
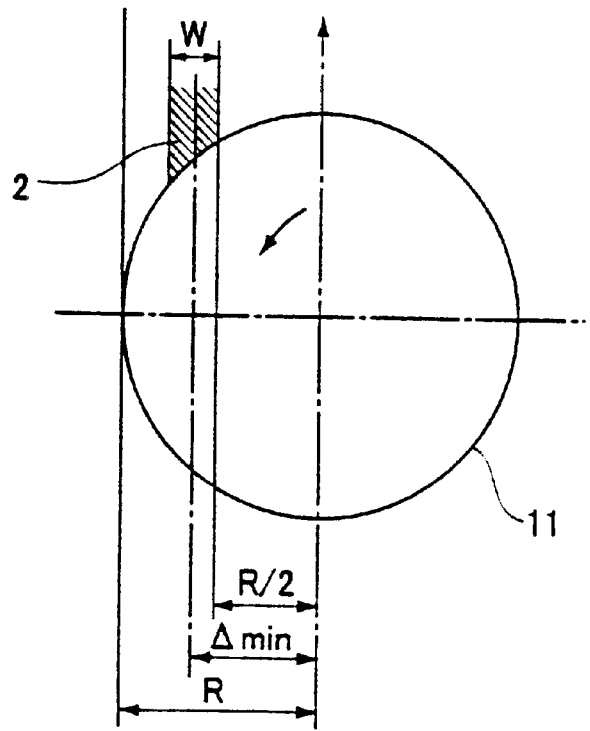

The above formula (1) is derived from the positional relationship between the cutter 11 having the circular cutting edge shown in FIGS. 7A and 7B and the burr 2. That is, the shortest distance A from the center of the cutter 11 to the center line of the width of the burr 2 must be less than (R−W/2) to perfectly cut the burr 2 (FIG. 7A). Further, the shortest distance A must exceed (R/2+W/2) to cut the burr 2 with the cutting edge located at a position spaced apart from the line, which passes through the center of the cutter 11 and is in parallel with the burr 2, by at least R/2 (FIG. 7B), from which the above formula (1) is derived.

Embodiment 3

Figure 8:
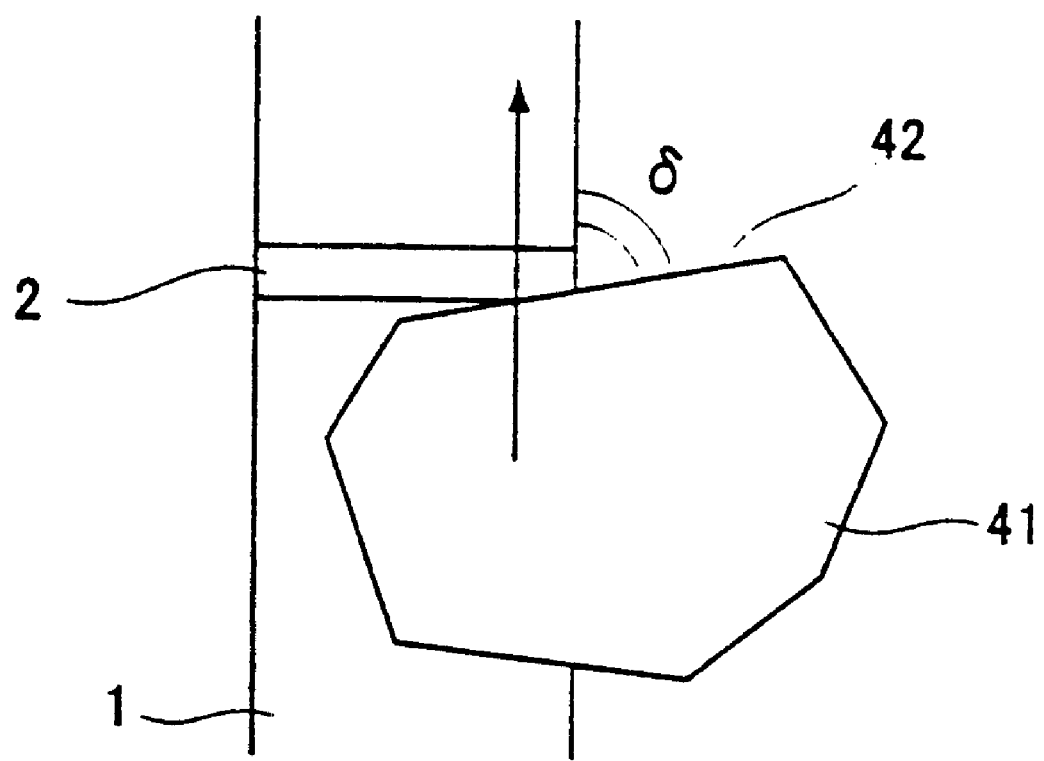
FIG. 8 is a schematic view of a burr removing method using a cutter having a polygonal cutting edge as another example of the present invention.
Figure 9A:
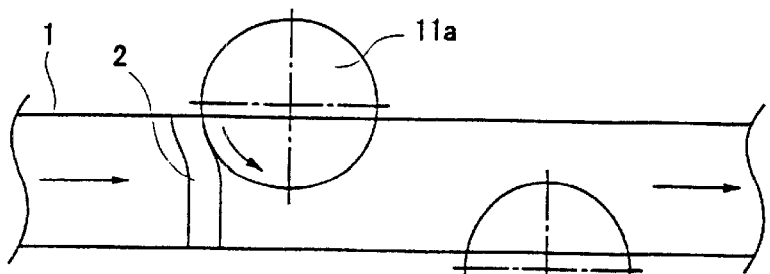
FIGS. 9A, 9B, 9C, 9D and 9E are schematic views (plan views) of a burr removing method using a cutter having a circular cutting edge as another example of the present invention.
Figure 9B:
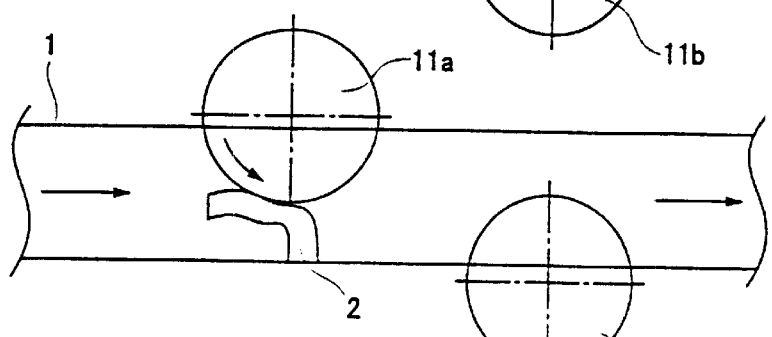
Figure 9C:
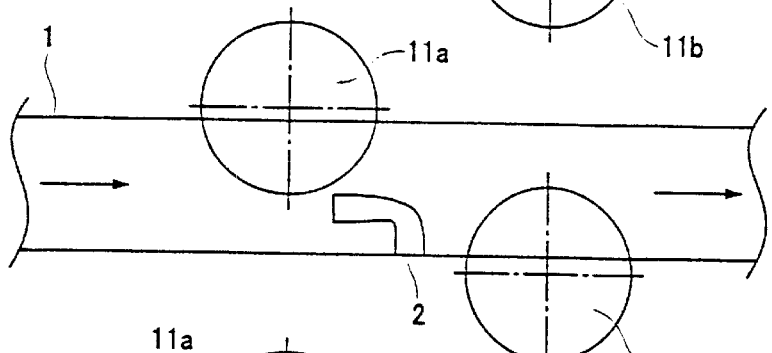
Figure 9D:
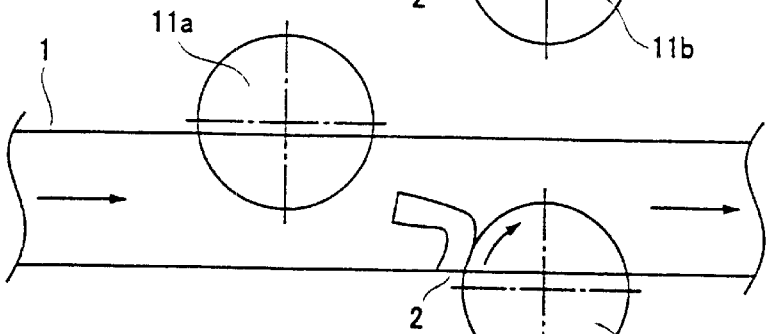
Figure 9E:
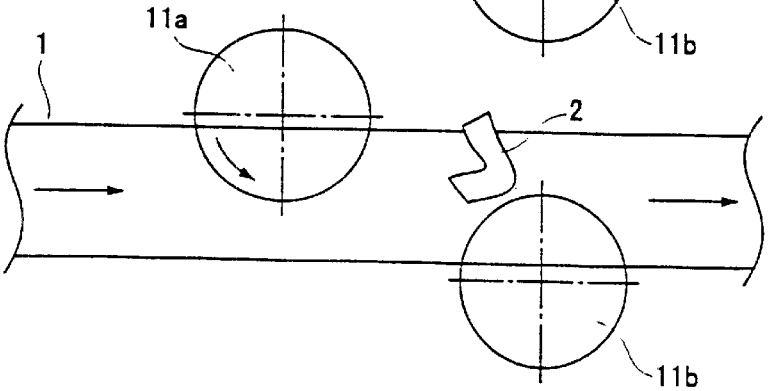

FIG. 8 schematically shows a burr removing method using a cutter having a polygonal cutting edge as another example of the present invention.

In the method, a cutter 41 having a polygonal cutting edge 42 is disposed such that the flank of the cutter 41 is substantially in parallel with the surface of a steel piece 1 on which a burr 2 exists and the angle δ between the polygonal cutting edge 42 which cuts the burr 2 and the edge of the steel piece 1 which the burr 2 intersects is 90° or less. Then, the burr 2 at the edge of the steel pipe 1 is cut by moving the cutter 41 so as to be perpendicular to the lengthwise direction of the burr 2.

Since the burr 2 is cut in such a manner that the angle δ between the polygonal cutting edge 42 which cuts the burr 2 and the edge of the steel piece 1 which intersects the burr 2 is 90° or less, no protruding burr is formed because the burr 2 at the edge of the steel piece 1 is pushed toward the inside of the steel piece 1.

Note that the positional relationship between the cutting edge and the surface of the steel piece and the shape of the polygonal cutting edge are similar to those of the embodiment 1.

Embodiment 4

FIG. 9A–FIG. 9E schematically show a burr removing method using a cutter having a circular cutting edge as another example of the present invention.

In the method, two cutters 11a and 11b each having a circular cutting edge are disposed such that the flanks of the cutters 11a and 11b are substantially in parallel with the surface of a steel piece 1 on which a burr 2 exists and the centers of the cutters 11a and 11b are separately located outwardly of both the edges of the steel piece 1 which the burr 2 intersects, respectively. Then, the burr 2 located at both the edges of the steel piece 1 is cut by moving the steel piece 1 so as to be perpendicular to the lengthwise direction of the burr 2.

Since the two cutters 11a and 11b are disposed such that the centers thereof are separately located outwardly of both the edges of the steel piece 1 which the burr 2 intersects, respectively, the burr 2 located at both the edges of the steel piece 1 is pushed toward the inside of the steel piece 1. Thus, no protruding burr is formed.

Figure 10:
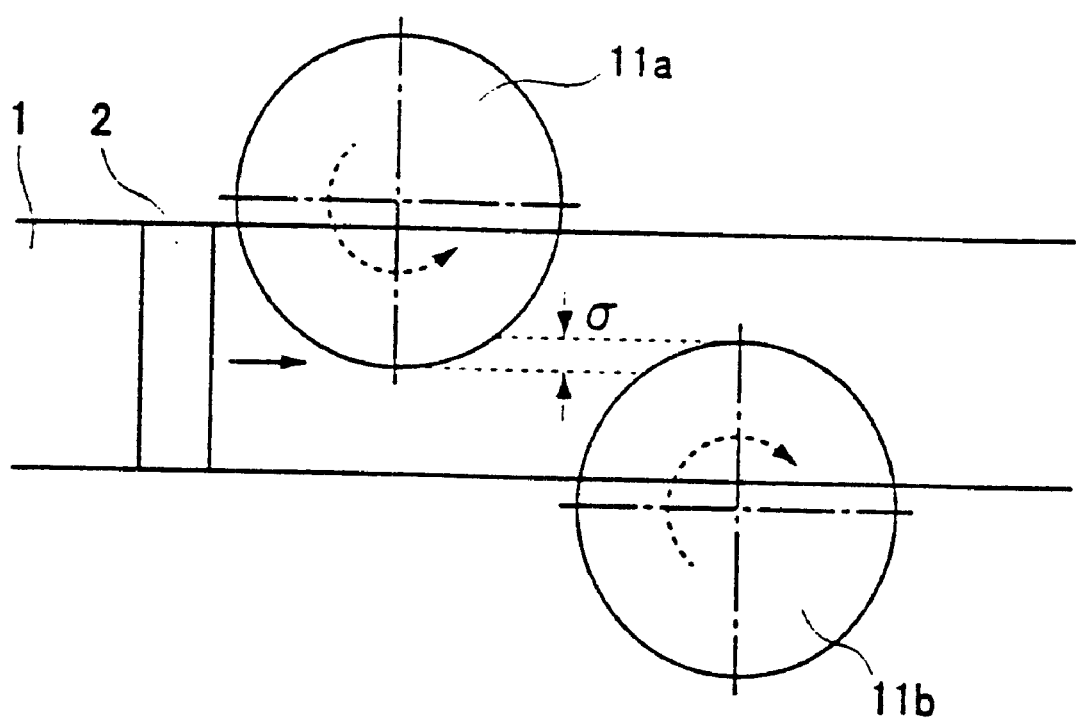
FIG. 10 is a view showing that the two cutters of FIGS. 9A, 9B, 9C, 9D and 9E are disposed along the lengthwise direction of a burr.
Figure 11A:
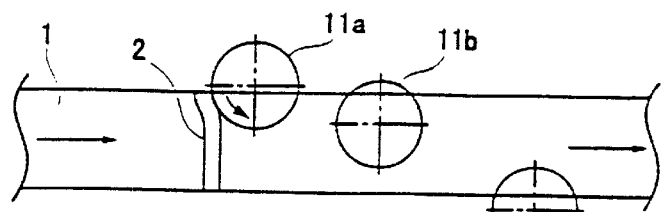
FIGS. 11A, 11B, 11C, 11D, 11E, 11F and 11G are schematic views (plan views) of a burr removing method using a cutter having a circular cutting edge as still another example of the present invention.
Figure 11B:
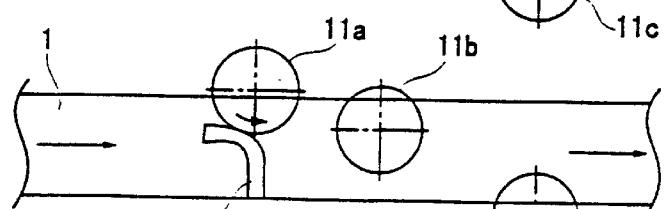
Figure 11C:
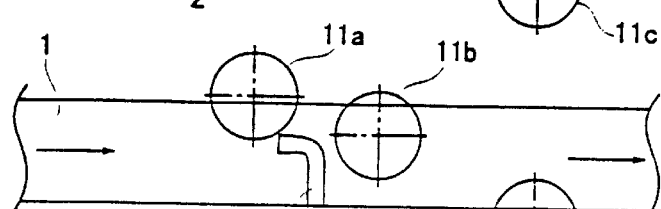
Figure 11D:
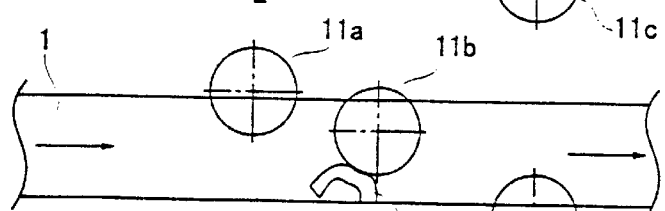
Figure 11E:
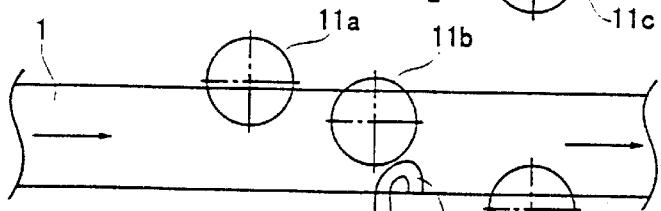
Figure 11F:
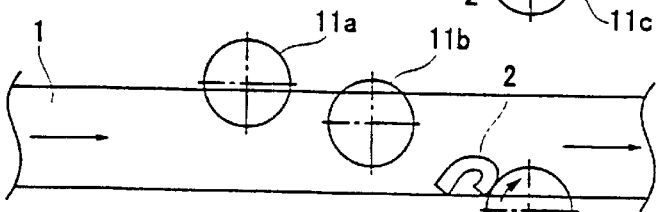
Figure 11G:
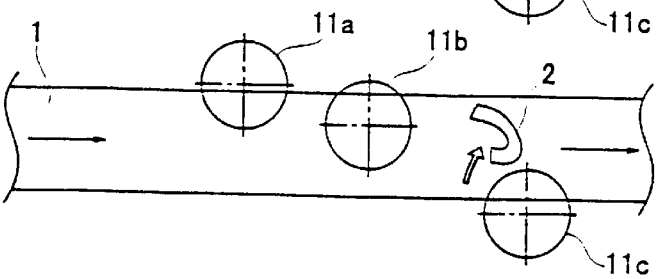

At the time, when the two cutters 11a and 11b are disposed so as to form an overlapped portion a in the lengthwise direction of the burr 2 as shown in FIG. 10, the burr 2 can be perfectly removed only by the two cutters 11a and 11b.

FIG. 11A–FIG. 11G show a method of using three cutters 11a, 11b and 11c each having a circular cutting edge. Similarly to the case shown in FIG. 9A–9E, the burr 2 located at both the edges of the steel piece 1 is removed without the occurrence of a protruding burr by the two cutters 11a and 11c which are disposed such that the centers thereof are separately located outwardly of both the edges of the steel piece 1 which the burr 2 intersects. Then, the burr 2 is perfectly removed because the portion of the burr 2 located in the vicinity of the center of the steel piece 1 in the width direction thereof is removed using the cutter 11b disposed between the cutters 11a and 11c so as to be overlapped therewith.

Embodiment 5

Figure 12:
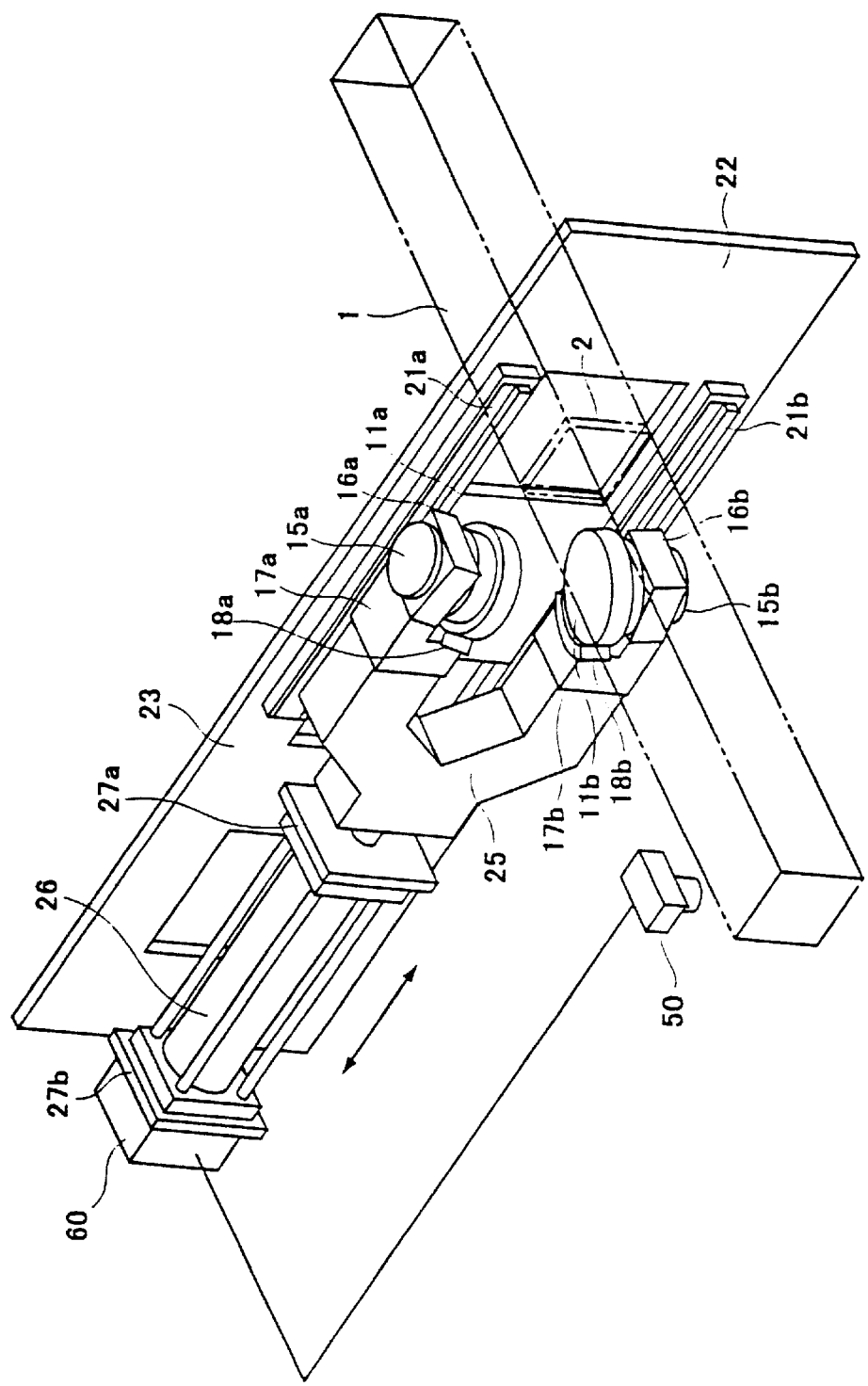
FIG. 12 is a schematic view of a burr removing apparatus as an example of the present invention.

FIG. 12 schematically shows a burr removing apparatus as an example of the present invention.

In the apparatus, the two cutters 11a and 11b each having the circular cutting edge are disposed to satisfy the above formula (1) with respect to a burr 2 on the surfaces of a steel piece 1 confronting each other and cut the burr 2 of the steel piece 1 by being relatively moved along the lengthwise direction of the burr 2.

The cutters 11a and 11b are disposed so as to satisfy the above formula (1) with respect to the burr 2 by adjusting the movement of the steel piece 1. When the burr is cut, the steel piece 1 stops and the cutters 11a and 11b simultaneously move from one end of the steel piece 1 to the other end thereof along the lengthwise direction of the burr 2 located on the confronting surfaces of the steel piece 1. Therefore, not only the portions of the burr 2 at the edges of the steel piece 1 but also the entire burr 2 is perfectly removed as a whole.

When the burr 2 on the surface of the steel piece 1 being moved is detected by a burr detector 50, a burr detecting signal is supplied to a drive control mechanism 60. Then, a linearly-moving actuator is actuated which is composed of a fluid pressure cylinder, an electric ball screw or the like, and laterally mounted on a base plate 22 disposed so as to be perpendicular to the steel piece 1 through flanges 27a and 27b. Thus, a Y-shaped base frame 25 mounted to the distal end of the linearly-moving actuator 26 slides in the direction of the steel piece 1 along cutting guide rails 21a and 21b disposed on the base plate 22. With this operation, the cutters 11a and 11b, which are disposed to the distal ends of the Y-shaped base frame 25 through cutter holders 17a and 17b and bearing cases 16a and 16b, approach the burr 2. At the time, the steel piece 1 is stopped at a position where the cutters 11a and 11b satisfy the above formula (1) with respect to the burr 2. Thereafter, the cutters 11a and 11b are moved along the lengthwise direction of the burr 2 by the linearly-moving actuator 26, to thereby cut the burr 2. Since the cutters 11a and 11b are disposed so as to satisfy the above formula (1) with respect to the burr 2, the burr 2 located at the edge of the steel piece 1 is cut without the occurrence of a protruding burr.

The two cutters 11a and 11b are fixed in bearing cases 16a and 16b so that they can be rotated through bearings. Stoppers 15a and 15b on the bearing cases 16a and 16b prevent the removal of the bearings from the bearing cases 16a and 16b. Further, the bearing cases 16a and 16b are fixed to the cutter holders 17a and 17b so as to have a desired clearance angle β. Chip removing plates 18a and 18b are mounted on the cutter holders 17a and 17b so as to almost in contact with the peripheral surfaces of the cutters 11a and 11b. Since the cutters 11a and 11b can be rotated through the bearings, they can naturally carry out a cutting operation at a different portion of the circular cutting edge without the need of a driving force, whereby the life of the cutters can be increased.

When welding burrs are removed in the continuous rolling and the like of billets, two sets of the apparatuses are successively disposed and a mechanism is provided to move the respective apparatuses in synchronism with the movement of the billets. With this arrangement, all the welding burrs formed on the four surfaces of the billets can be cut while the billets are moved.

Embodiment 6

Figure 13:
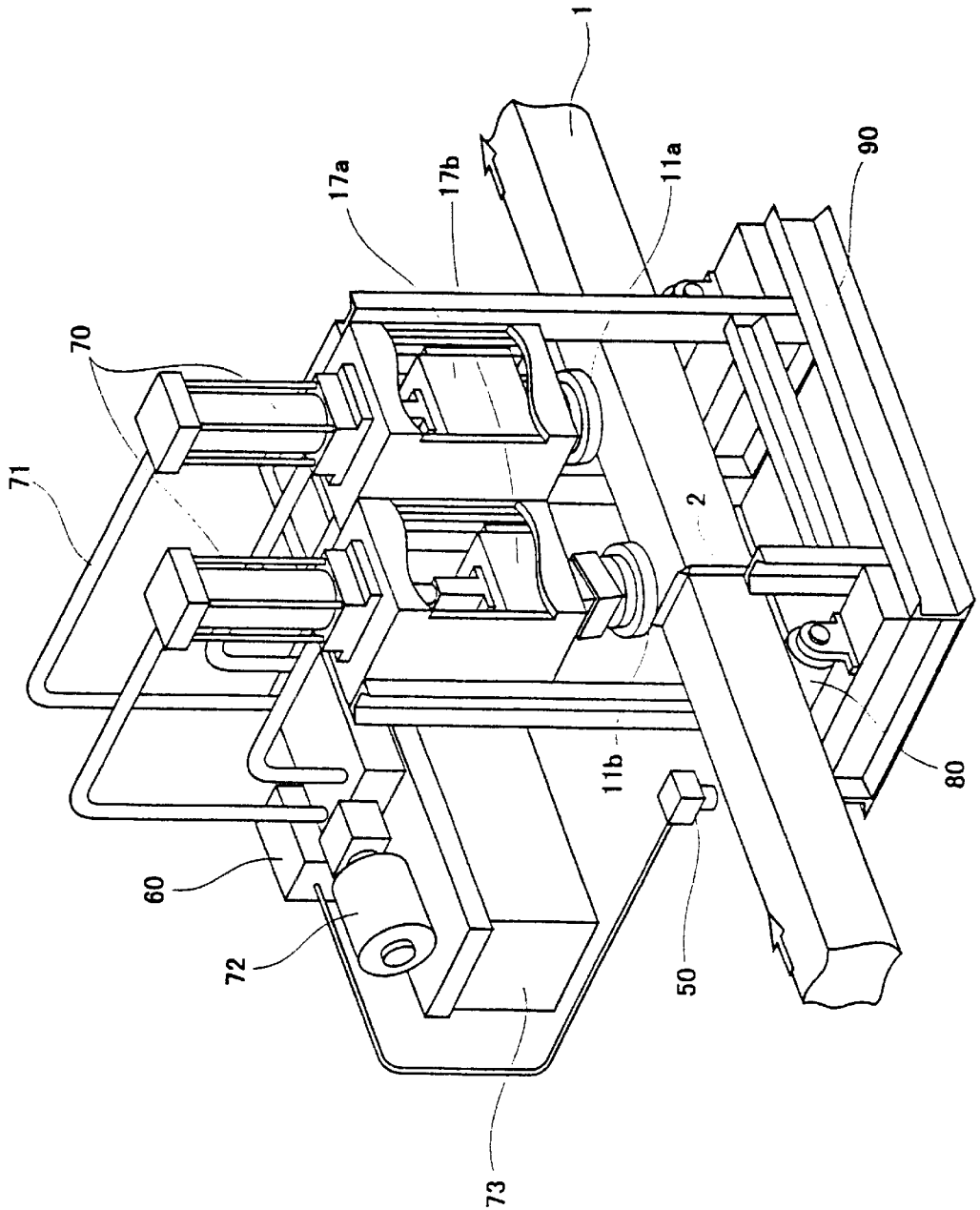
FIG. 13 is a schematic view of a burr removing apparatus as another example of the present invention.

FIG. 13 schematically shows a burr removing apparatus as another example of the present invention.

In the apparatus, the two cutters 11a and 11b each having the circular cutting edge are disposed such that the centers of the cutters 11a and 11b are separately located outwardly of both the edges of a steel piece 1 which a burr 2 intersects, and the burr 2 of the steel piece 1 is cut by relatively moving the steel piece 1 so that the two cutters 11a and 11b are perpendicular to the lengthwise direction of the burr 2.

The two cutters 11a and 11b are previously set such that the centers thereof are separately located outwardly of both the edges of the steel piece 1 which the burr 2 intersects and the positions of the cutters in the width direction of the steel piece 1 is fixed. Therefore, the width of the steel piece 1 from which the burr 2 is cut is always constant. When the burr 2 is cut, the cutters 11a and 11b are lowered and stopped on the surface of the steel piece 1. Then, the burr 2 of the moving steel piece 1 is cut from a direction perpendicular to the lengthwise direction of the burr 2. Further, since the two cutters 11a and 11b re disposed such that they are partly overlapped each other along the lengthwise direction of the burr 2, not only the portions of the burr 2 at the edges of the steel piece 1 but also the entire burr 2 is perfectly removed as a whole.

When the burr 2 on the surface of the steel piece 1, which is moved on transportation rollers, is detected by the burr detector 50, a burr detecting signal is supplied to the drive control mechanism 60. Then, hydraulic cylinders 70 disposed above the steep piece 1 is actuated and the cutters 11a and 11b, which are mounted on the distal ends of the hydraulic cylinders 70 through cutter holders 17a and 17b, are lowered and stopped at the positions on the surface of the steel piece 1 which are suitable for the cut of the burr 2. Since the steel piece 1 is being moved, the burr 2 on the steel piece 1 is cut with the cutters 11a and 11b from a direction perpendicular to the lengthwise direction of the burr 2. Since the cutters 11a and 11b are disposed such that the centers thereof are separately located outwardly of both the edges of the steel piece 1 which the burr 2 intersects, the burr 2 located at the edges of the steel piece 1 is cut without the occurrence of a protruding burr.

Oil is pumped from an oil tank 73 by an oil pump 72 and supplied to the hydraulic cylinders 70 through hydraulic pipes 71.

When welding burrs are removed in the continuous rolling and the like of billets, four sets of the apparatuses are successively disposed such that the respective cutters confront the four surfaces of the billets. With this arrangement, all the welding burrs formed on the four surfaces of the billets can be continuously cut.

What is claimed is:

1. A burr removing method comprising the steps of:

disposing a cutter having a circular cutting edge such that the flank of-the cutter is substantially in parallel with the surface of a steel piece on which a burr exists and the center of the cutter is located outwardly of the edge of the steel piece which the burr intersects; and cutting the burr located at an edge of the steel piece by relatively moving the cutter perpendicularly to the lengthwise direction of the burr.

2. A method according to claim 1, wherein a rotatable cutter having a circular cutting edge is used.

3. A burr removing apparatus comprising:

a burr detector;

a plurality of at least two cutters; and a drive control mechanism for causing the cutters to approach to a burr in response to a burr detecting signal issued by said burr detector, wherein two cutters of the plurality of cutters have a circular cutting edge and the two cutters having the circular cutting edge are disposed such that the centers thereof are separately located outwardly of both the edges of a steel piece which the burr intersects.

* * * * *